(12) United States Patent
Tsunematsu

(10) Patent No.: US 11,157,747 B2
(45) Date of Patent: Oct. 26, 2021

(54) INFORMATION-PROCESSING SYSTEM, INFORMATION-PROCESSING APPARATUS, METHOD OF PROCESSING INFORMATION, AND STORAGE MEDIUM STORING PROGRAM FOR CAUSING COMPUTER TO EXECUTE METHOD OF PROCESSING INFORMATION

(71) Applicant: CANON KABUSHIKI KAISHA, Tokyo (JP)

(72) Inventor: Yuichi Tsunematsu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 16/557,772

(22) Filed: Aug. 30, 2019

(65) Prior Publication Data

US 2019/0384992 A1 Dec. 19, 2019

Related U.S. Application Data

(63) Continuation of application No. PCT/JP2018/005979, filed on Feb. 20, 2018.

(30) Foreign Application Priority Data

Mar. 6, 2017 (JP) .............................. JP2017-042043

(51) Int. Cl.
*G06K 9/00* (2006.01)
*G06T 7/246* (2017.01)
*G06T 7/73* (2017.01)
*G06T 11/20* (2006.01)

(52) U.S. Cl.
CPC .......... *G06K 9/00778* (2013.01); *G06T 7/246* (2017.01); *G06T 7/73* (2017.01); *G06T 11/20* (2013.01); *G06T 2207/30196* (2013.01); *G06T 2207/30242* (2013.01)

(58) Field of Classification Search
None
See application file for complete search history.

(56) References Cited

U.S. PATENT DOCUMENTS

2009/0122058 A1* 5/2009 Tschesnok .............. G06T 7/564
345/420
2011/0181714 A1* 7/2011 Hongo ...................... G06T 7/20
348/135

(Continued)

FOREIGN PATENT DOCUMENTS

CN 103236160 A 8/2013
CN 104392268 A 3/2015

(Continued)

*Primary Examiner* — James A Thompson
(74) *Attorney, Agent, or Firm* — Canon U.S.A., Inc. IP Division

(57) ABSTRACT

A setting unit associates a position in an image that is imaged by a camera with a position in a map that is obtained in advance. A detection unit detects a person in the image that is imaged by the camera. A display unit converts a position of the person detected into an associated position in the map on the basis of a setting made by the setting unit, totalizes a result of human congestion state and human flow that represents human movement on the basis of the converted position, and displays a result that is obtained.

27 Claims, 17 Drawing Sheets

(56) References Cited

U.S. PATENT DOCUMENTS

| | | | | |
|---|---|---|---|---|
| 2013/0101159 | A1* | 4/2013 | Chao | G06K 9/00771 |
| | | | | 382/103 |
| 2015/0146006 | A1* | 5/2015 | Kawano | H04N 5/247 |
| | | | | 348/159 |
| 2016/0092739 | A1* | 3/2016 | Oami | G06T 7/292 |
| | | | | 348/159 |
| 2017/0148178 | A1* | 5/2017 | Oami | G06T 7/292 |
| 2017/0148324 | A1* | 5/2017 | High | G06K 9/00771 |
| 2017/0256044 | A1* | 9/2017 | Maruyama | G06K 9/4671 |
| 2017/0257576 | A1* | 9/2017 | Mitsui | G06K 9/00664 |
| 2018/0247135 | A1* | 8/2018 | Oami | G06T 11/60 |
| 2018/0286068 | A1* | 10/2018 | Matsubara | H04N 5/272 |
| 2019/0012547 | A1* | 1/2019 | Togashi | G06K 9/00778 |

FOREIGN PATENT DOCUMENTS

| | | |
|---|---|---|
| CN | 104574437 A | 4/2015 |
| CN | 105069429 A | 11/2015 |
| CN | 105354784 A | 2/2016 |
| CN | 105575299 A | 5/2016 |
| CN | 105611253 A | 5/2016 |
| CN | 105681768 A | 6/2016 |
| JP | 2007-243342 A | 9/2007 |
| JP | 2009134688 A | 6/2009 |
| JP | 2014179922 A | 9/2014 |
| JP | 2014179923 A | 9/2014 |
| JP | 5597781 B1 | 10/2014 |
| JP | 2015061239 A | 3/2015 |
| JP | 2016082506 A | 5/2016 |
| JP | 2016206995 A | 12/2016 |
| WO | 2013128852 A1 | 9/2013 |

* cited by examiner

FIG. 10A
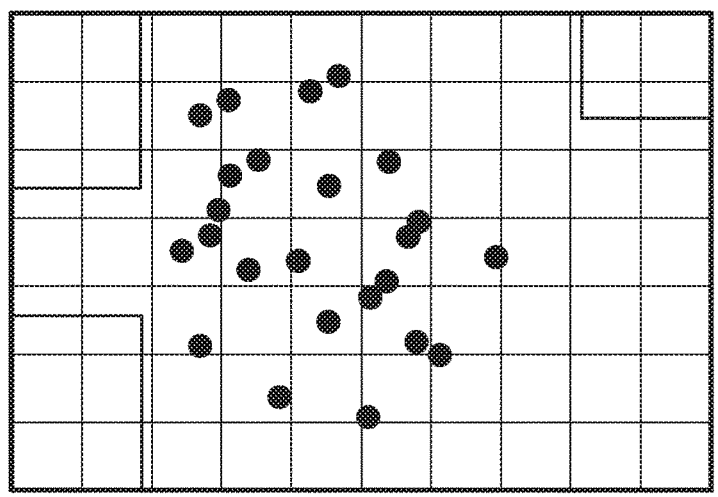
FIG. 10B
| | | | | 1 | | | | |
|---|---|---|---|---|---|---|---|---|
| | | 1 | 1 | 1 | | | | |
| | | | | 2 | 1 | 1 | | |
| | | 2 | 1 | 1 | 3 | 1 | | |
| | | 1 | | 1 | 2 | 1 | | |
| | | | 1 | | 1 | | | |
| | | | | | | | | |
FIG. 10C
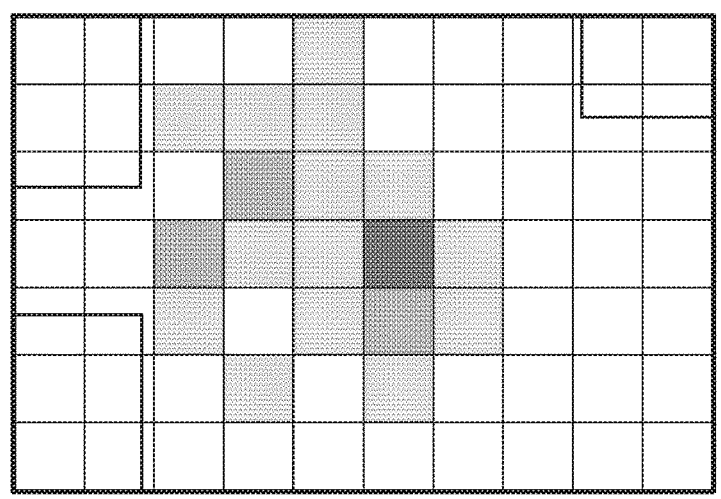

FIG. 11
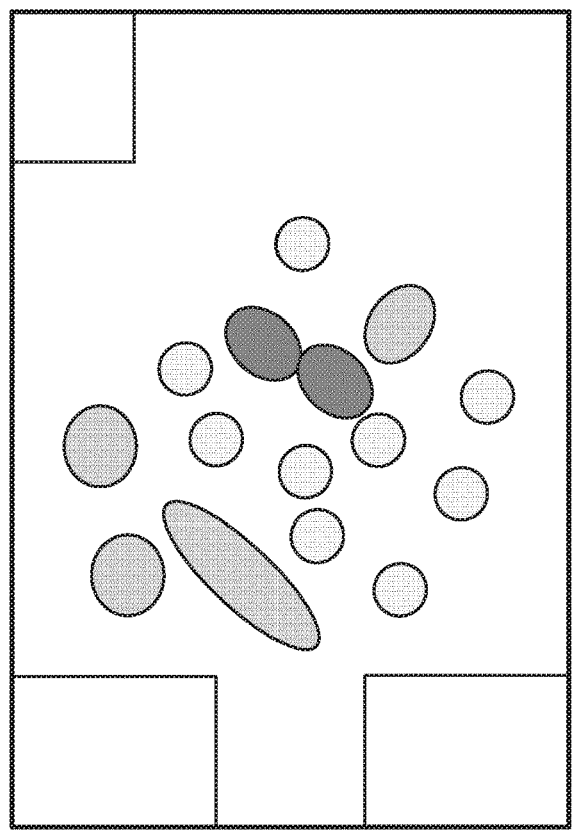
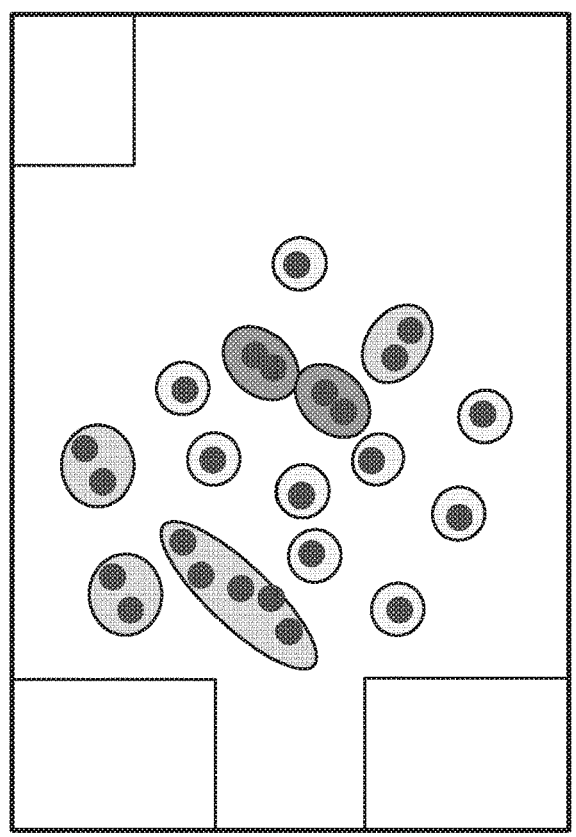

RANDOM SELECTION: UPPER LEFT OR RIGHT
MAJORITY DECISION: UPPER LEFT
SELECTION OF ONE HAVING HIGH MOVEMENT SPEED: →

INFORMATION-PROCESSING SYSTEM, INFORMATION-PROCESSING APPARATUS, METHOD OF PROCESSING INFORMATION, AND STORAGE MEDIUM STORING PROGRAM FOR CAUSING COMPUTER TO EXECUTE METHOD OF PROCESSING INFORMATION

CROSS-REFERENCE TO RELATED APPLICATIONS

This application is a Continuation of International Patent Application No. PCT/JP2018/005979, filed Feb. 20, 2018, which claims the benefit of Japanese Patent Application No. 2017-042043, filed Mar. 6, 2017, both of which are hereby incorporated by reference herein in their entirety.

TECHNICAL FIELD

The present invention relates to a technique for analyzing and visualizing a human congestion state and human movement flow by using the position of a person in an image.

BACKGROUND ART

There are an increasing number of cases where an image of a surveillance camera is analyzed and used. For example, the state of activities of objects in a specific region can be grasped by counting the number of people in the specific region or counting the number of people who pass or move a region or a line. Such information can be used to improve human flow due to a notice or change in layout, to consider optimum arrangement of security personnel, and to utilize marketing in a shopping mall.

Japanese Patent No. 5597781 discloses a stagnation-state-analyzing apparatus that divides an imaged image into blocks, totalizes a detection result of an object in each block, creates a background image in which no object is pictured, and superposing a heat map for visualizing a totalization result on the created background. There is a technique for achieving visualization of a movement path and a path of flow of a person in the imaged image.

However, there is a need to grasp congestion, stagnation, and human flow at the same time and to further improve visualization.

SUMMARY OF INVENTION

To achieve the above object, a system for displaying a result of analysis of a human congestion state, or human flow that represents human movement, or both includes a setting unit that associates a position in an image that is imaged by a camera with a position in a map that is obtained in advance, a detection unit that detects a person in the image that is imaged by the camera, a totalization unit that converts a position of the person detected by the detection unit into an associated position in the map on the basis of a setting made by the setting unit and that totalizes a result of the human congestion state, or the human flow that represents the human movement, or both on the basis of the converted position, and a display unit that displays a result that is obtained by the totalization unit in a region into which the map is divided.

Further features of the present invention will become apparent from the following description of exemplary embodiments with reference to the attached drawings.

BRIEF DESCRIPTION OF DRAWINGS

FIG. 10A illustrates a way of thinking congestion totalization.

FIG. 10B illustrates a way of thinking congestion totalization.

FIG. 10C illustrates a way of thinking congestion totalization.

FIG. 11 illustrates an example of congestion totalization that is carried out by using density.

DESCRIPTION OF EMBODIMENTS

The present invention will hereinafter be described in detail by using a preferred embodiment with reference to the attached drawings. A structure according to the following embodiment is described by way of example. The present invention is not limited to the structure illustrated.

The embodiment of the present invention will now be described with reference to the drawings.

Figure 1:
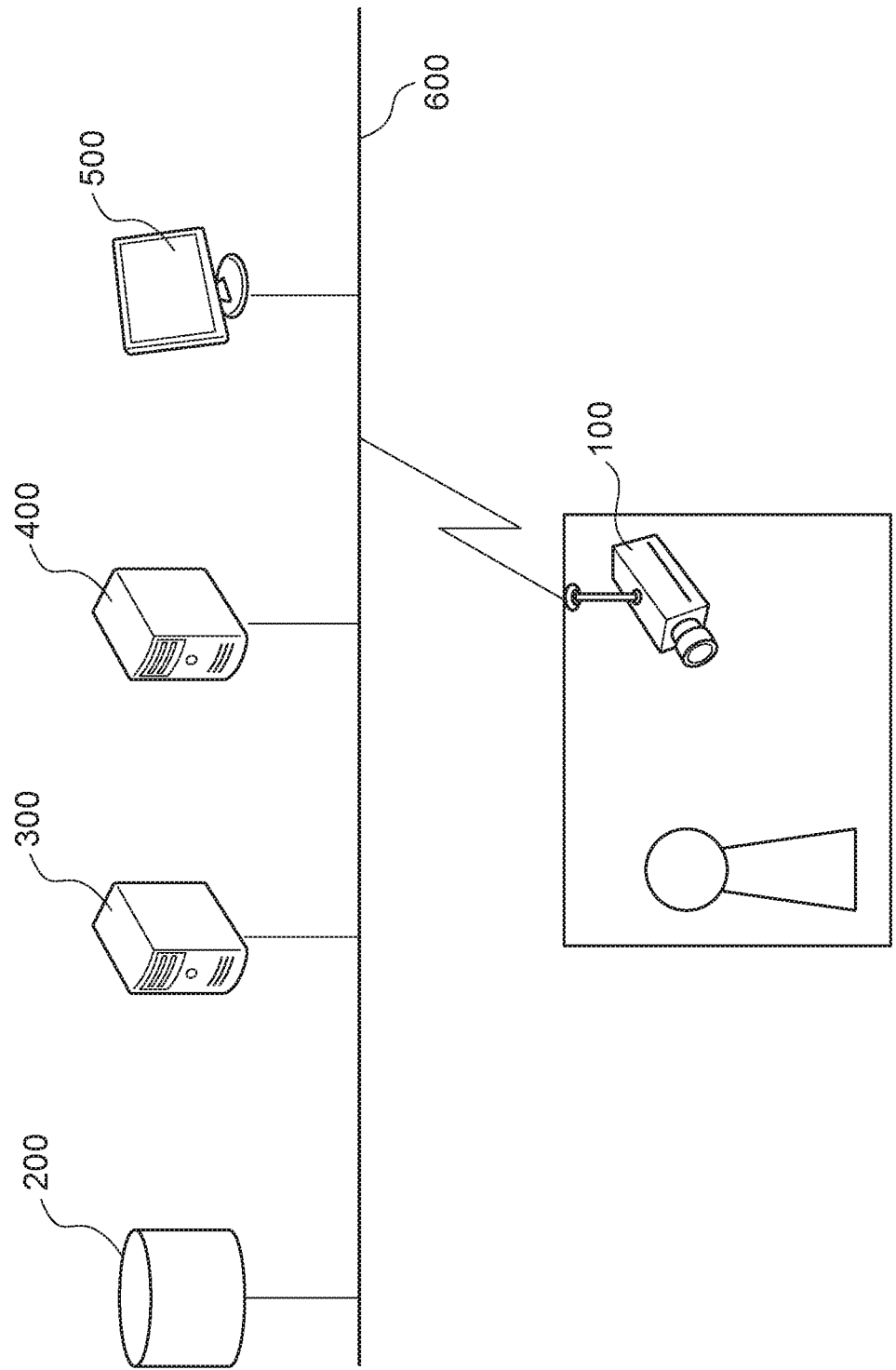
FIG. 1 is a network connection diagram illustrating operational environment of a human-flow-analyzing system according to a first embodiment of the present invention.

FIG. 1 is a network connection diagram illustrating operational environment of a human-flow-analyzing system as an information-processing system according to the embodiment of the present invention. As illustrated in FIG. 1, a network camera 100, a network storage device 200, an image-analyzing server apparatus 300, a human-flow-analyzing sever apparatus 400, and an image-displaying apparatus 500 are connected by a LAN 600, which is a network line.

The network camera 100 is an imaging device and has a function of distributing encoded image data and a result of image analysis of the image data via the LAN 600. The network storage device 200 records the image data that is distributed from the network camera 100 and the result of an image analysis process via the LAN 600. The image-analyzing server apparatus 300 reads the image data and the result of the image analysis process that are recorded in the network storage device 200 via the LAN 600 and generates a detection result of an object to be totalized. The human-flow-analyzing sever apparatus 400 totalizes the detection result that is generated by the image-analyzing server apparatus 300 and generates an analysis result of the degree of human congestion and human flow. The image-displaying apparatus 500 plays and displays the image data that is distributed from the network camera 100 and the image data that is recorded in the network storage device 200. In addition, an input screen such as a window for visualization setting is displayed, instructions for setting a superposed image and for a totalization method are transmitted to the human-flow-analyzing sever apparatus 400 in response to a user operation, and the totalization result that is received is displayed. In FIG. 1, the network storage device 200, the image-analyzing server apparatus 300, the human-flow-analyzing sever apparatus 400, and the image-displaying apparatus 500, which are different apparatuses, are connected to the LAN 600 but are not limited thereto. These apparatuses may be integrally formed as a single apparatus or plural apparatuses. When the network camera 100 has a storage function, the network camera 100 may have the function of the network storage device 200. The network camera 100 may have the functions of the image-analyzing server apparatus 300 and the human-flow-analyzing sever apparatus 400.

Figure 2:
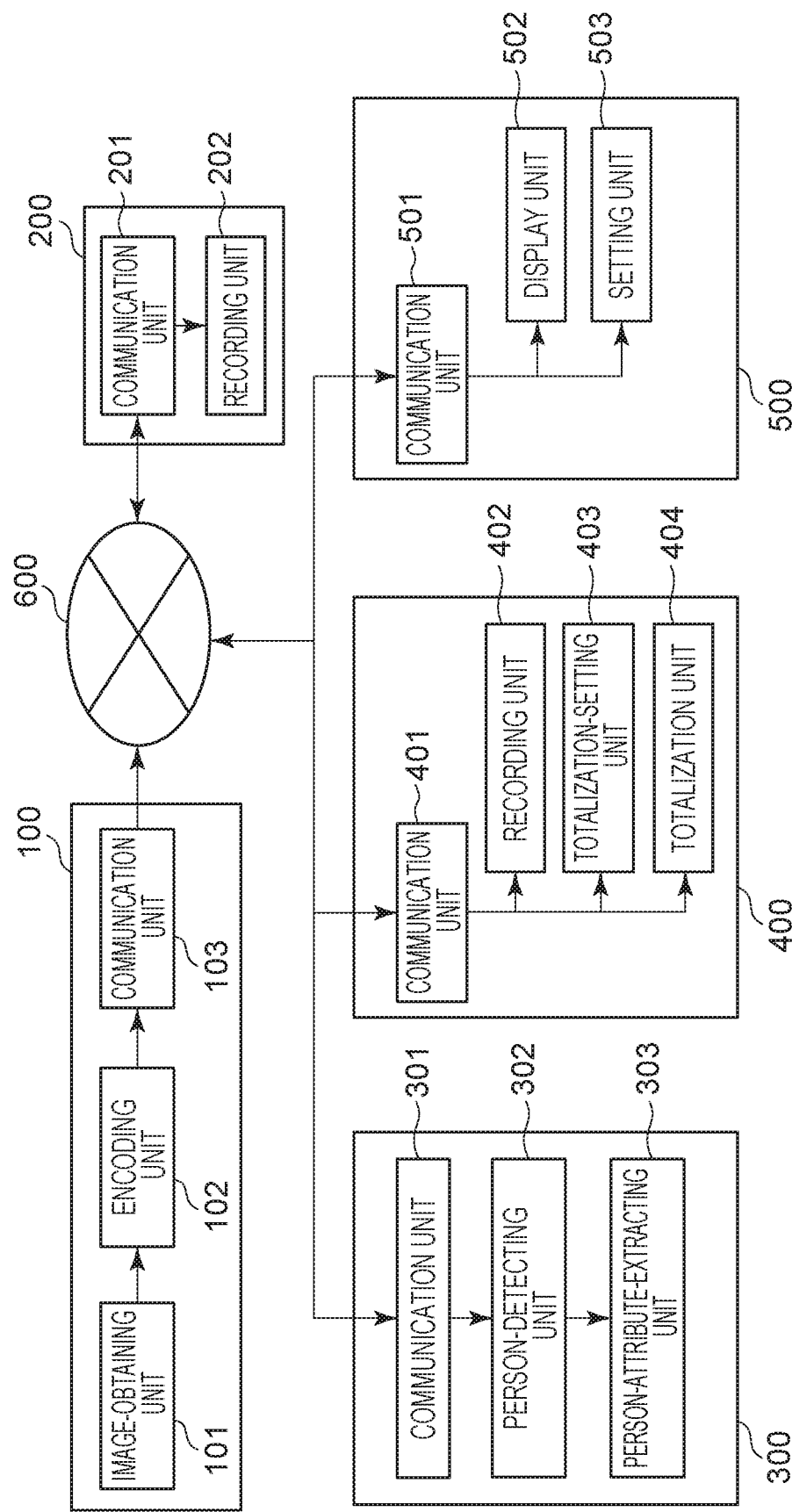
FIG. 2 is a block diagram of the human-flow-analyzing system according to the first embodiment of the present invention.

FIG. 2 is a block diagram of the human-flow-analyzing system in FIG. 1. The network camera 100 includes an image-obtaining unit 101 that includes, for example, an imaging element, an encoding unit 102, and a communication unit 103. An imaged image is converted into image data in a form that can be communicated by the LAN 600. The converted image data is transmitted to the network storage device 200, the image-analyzing server apparatus 300, and the image-displaying apparatus 500 via the communication unit 103. The network storage device 200 receives the image data from the LAN 600 by using a communication unit 201 and records the image data in a recording unit 202 that includes a non-volatile memory having a large capacity such as a hard disk drive. The image-analyzing server apparatus 300 obtains the image data that is recorded in the network camera 100 and the network storage device 200 from the LAN 600 by using a communication unit 301. The image-analyzing server apparatus 300 detects the position of the body of a person who is detected by a person-detecting unit 302. A person-attribute-extracting unit 303 of the image-analyzing server apparatus 300 extracts person attribute information about appearance characteristics of the person such as the age and gender. The attribute information and information about the obtained detection position in the image are transmitted to the human-flow-analyzing sever apparatus 400 via the communication unit 301. The human-flow-analyzing sever apparatus 400 receives the attribute information about the appearance characteristics of the person and the information about the detection position of the person in the image from the LAN 600 by using a communication unit 401, and the information is recorded by a recording unit 402. When an instruction for setting totalization about the degree of human congestion and the human flow is received from the image-displaying apparatus 500, a setting that is instructed is saved in a totalization-setting unit 403. In accordance with the saved setting, a totalization unit 404 performs a totalization process of the congestion and the human flow. The image-displaying apparatus 500 receives an result of totalization of the degree of the human congestion and the human flow from the LAN 600 by using a communication unit 501, and a display unit 502 displays the result. The image-displaying apparatus 500 also has a function of receiving a setting of the totalization method by a setting unit 503.

Figure 14:
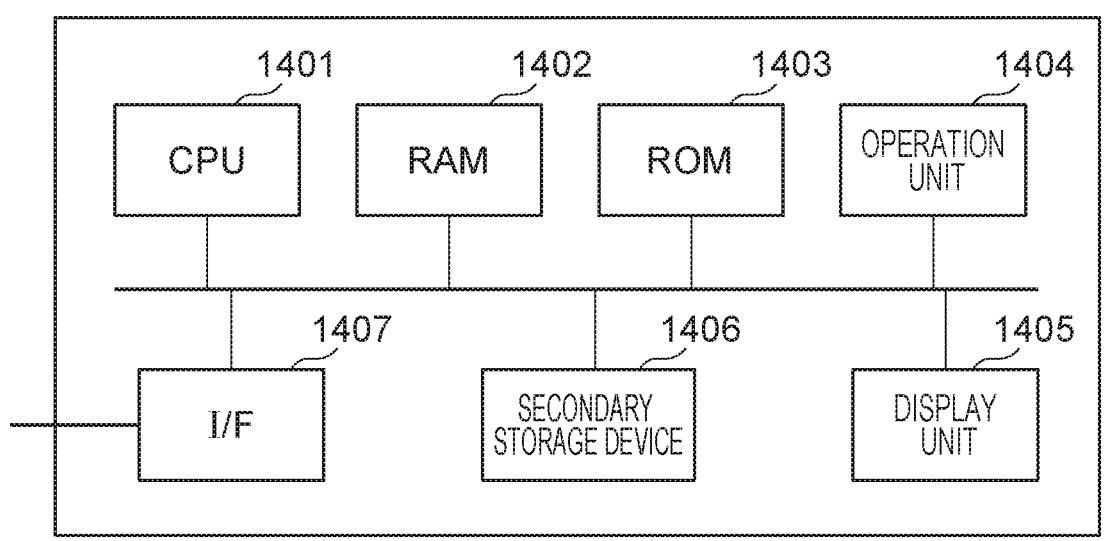
FIG. 14 illustrates an example of the hardware structure of each apparatus.

FIG. 14 illustrates an example of the hardware structure of an information-processing apparatus 1400 that functions as the image-displaying apparatus 500, the human-flow-analyzing sever apparatus 400, and the image-analyzing server apparatus 300.

A CPU 1401 controls the entire information-processing apparatus 1400 by using a computer program and data that are stored in a RAM 1402 and a ROM 1403.

The RAM 1402 has an area in which the computer program and data that are loaded from the ROM 1403 and data that is obtained from the outside via an I/F (interface) 1407 are temporally stored. The RAM 1402 also has a work area that is used when the CPU 1401 performs various processes. That is, the RAM 1402 can be assigned as, for example, an image memory and can appropriately provide various other areas.

The ROM 1403 stores, for example, setting data of the information-processing apparatus 1400 and software programs that can be executed by the information-processing apparatus, which is a computer. An operation unit 1404 includes, for example, a keyboard and a mouse and can input various instructions into the CPU 1401 in response to a user operation on the information-processing apparatus 1400. A display unit 1405 is a display device that includes a screen such as a LCD and that displays the image from the network camera 100 and the result of a process performed by the CPU 1401.

A secondary storage device 1406 is an information storage device having a large capacity represented by a hard disk drive device. In the external storage device 1408, an OS (operating system) and computer programs for performing the functions of components illustrated in FIG. 14 by the CPU 1401 are saved. Specifically, the programs are performed by the CPU 1401 for flowcharts of operations illustrated in FIG. 15 to FIG. 17. In the external storage device 1408, the image from the network camera 100 is also saved.

The software programs that can be executed by the computer and the data that are saved in the secondary storage device 1406 are appropriately loaded to the RAM 1402 in accordance with control of the CPU 1401 and processed by the CPU 1401. The I/F 1407 connects a network such as a LAN or the internet and other devices such as a projection device and a display device. The information-processing apparatus 1400 can obtain and transmit various kinds of information via the I/F 1407.

In the case of the hardware structure of the network camera 100, image units such as an imaging element and a lens are added to the hardware structure illustrated in FIG. 14, but the operation unit 1404 and the display unit 1405 may be omitted. Also, regarding the hardware structure of the network storage device 200, the operation unit 1404 and the display unit 1405 may be omitted from FIG. 14.

The process of the human-flow-analyzing system is divided mainly into an image analysis process, a setting process, and a totalization process. The human-flow-analyzing system with the above structure according to the embodiment to which the present invention is applied will be described in detail.

Figure 15:
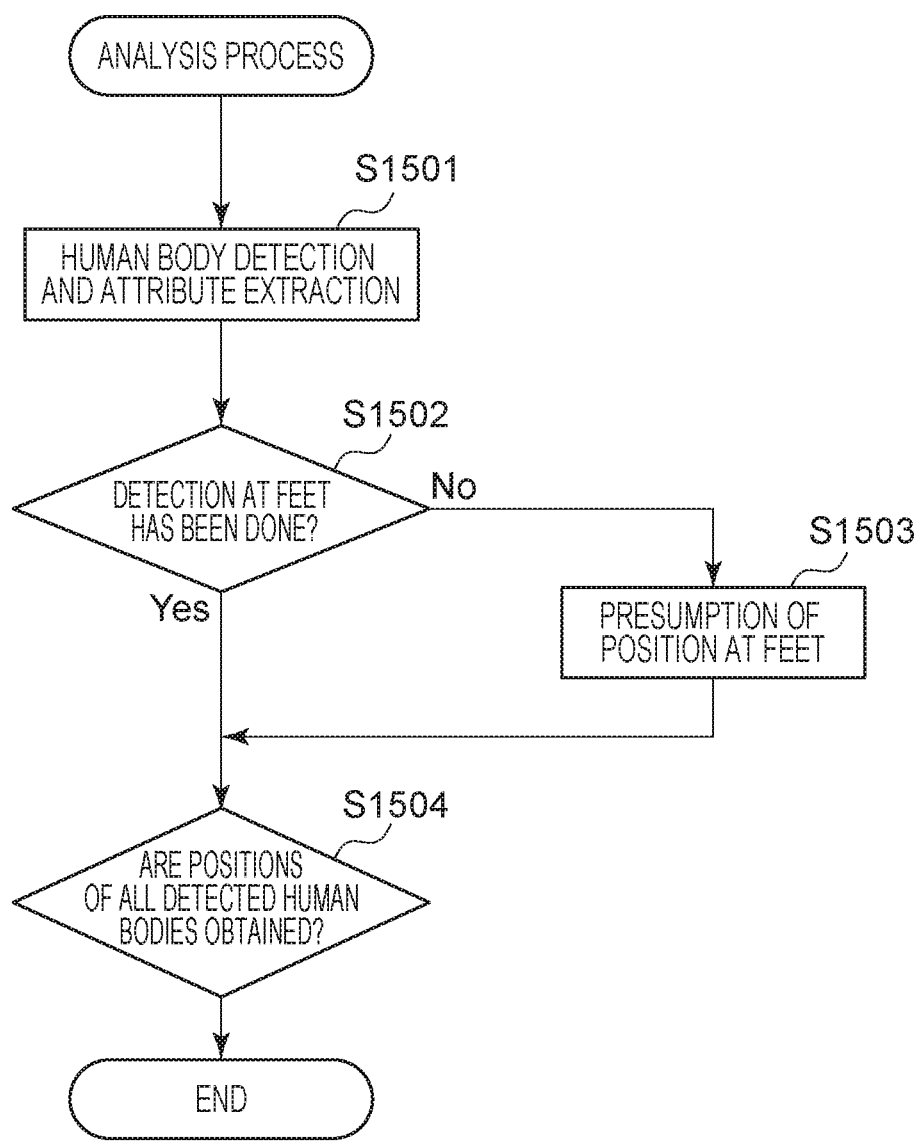
FIG. 15 illustrates a flowchart of an image analysis process that is performed by an image-analyzing server apparatus 300.

The description begins with the image analysis process that is performed by the image-analyzing server apparatus 300 with reference to FIG. 15.

Figure 3:
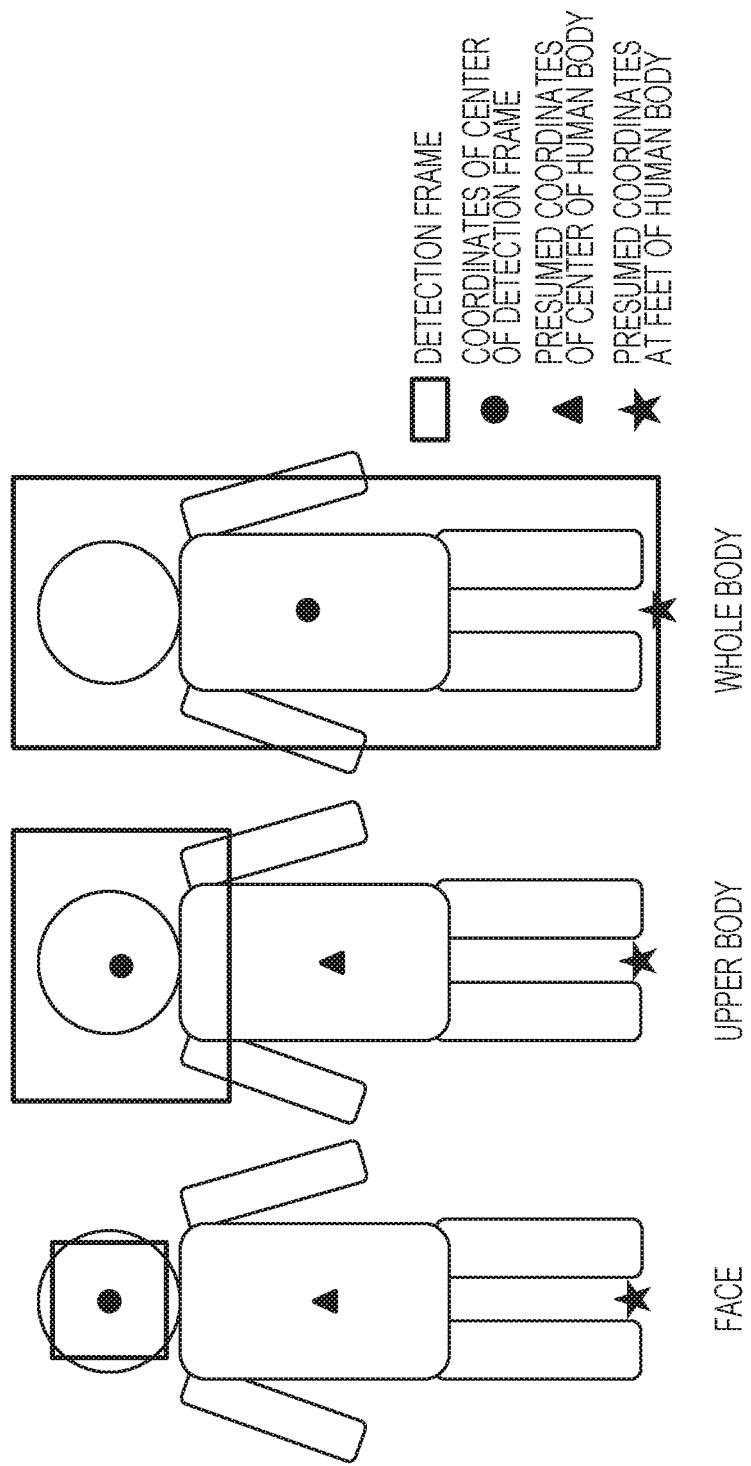
FIG. 3 illustrates association between detection frames for faces and human bodies and coordinate information that is used for totalization.

At S1501, the person-detecting unit detects a person, which is an object, by analyzing image data that is obtained from an image that is imaged by the network camera 100. In the case where there are people in the image, each person is identified and followed in the time series. Objects to be detected during person detection include the face, the upper body, and the whole body of the human body. FIG. 3 illustrates examples of a detection result in each case. According to the present embodiment, each detection result is illustrated by illustrating a portion of the detected human body by a rectangle. In general, coordinates of the center of a rectangle that is detected can be readily obtained. However, when the position of a portion of the human body away from the ground is associated with a position in the map, an error is likely to increase. Accordingly, coordinates of the position of the center of the human body or the position at the feet are more preferably used than those of the center of the face that is away from the ground as the position of the human body to be detected.

When the whole body can be detected, the coordinates of the center of the human body or at the feet can be readily obtained. However, there are many cases where a portion from the lower body to the position at the feet is not photographed due to overlapping or an obstacle under congestion environment. The frequency at which the upper bodies overlap increases due to congestion. Accordingly, upper body detection and face detection are preferably switched depending on the circumstances. For example, the ratio of moving-body regions in the imaged image can be used to determine switching. Specifically, when the ratio of regions of the human body to an image region is less than a predetermined value, upper body detection and face detection processes are performed. Whether the whole body is detected or the human body is detected may be determined on the basis of the aspect ratio of each moving-body region. For example, when the ratio of the width to the height of the moving-body region is more than a predetermined value, the upper-body detection process or the face detection process is performed.

In the case where the detected portion of the human body is the face or the upper body at S1502, the flow proceeds to S1503, and the position at the feet (or the position of the center of the human body) in the imaged image is presumed. At S1503 at which the face or the upper body is used, the coordinates of the center of the human body and the position at the feet are presumed by changing the aspect ratio of each detection frame on the basis of a predetermined rule. For example, the coordinates of the position at the feet can be presumed in a manner in which the detection frame of the upper body that is quadrupled in the lower direction is dealt with as a virtual whole body frame.

Information that is passed to the totalization process that is to be subsequently performed needs to include not only the detection result of the image that is currently processed but also at least one of detection and follow results of past images, for this is used to calculate the movement direction of a person by the totalization process.

At S1501, appearance characteristics and attributes such as the gender and the age may be extracted from the detected face, upper body, and whole body images and may be passed to the totalization process in addition to detection coordinates. Applying an attribute to the detected person enables the attribute to be used as a condition during totalization. For example, congestion and human flow by, for example, the gender and the age can be used for, for example, marketing.

Coordinate values that represent the detection position of the human body and information about the attributes of the human body can be obtained for all of the images that are inputted. However, when a totalization period is set to be longer than the frame rates of the images, not all of the results may be totalized, but a part thereof may be omitted in accordance with a predetermined rule. For example, the rule may be defined by a predetermined interval such as once a second, or once every few seconds. Most detection results in a predetermined period for writing or a result with high detection precision may be selected for use instead of the omission at the predetermined interval.

Figure 16:
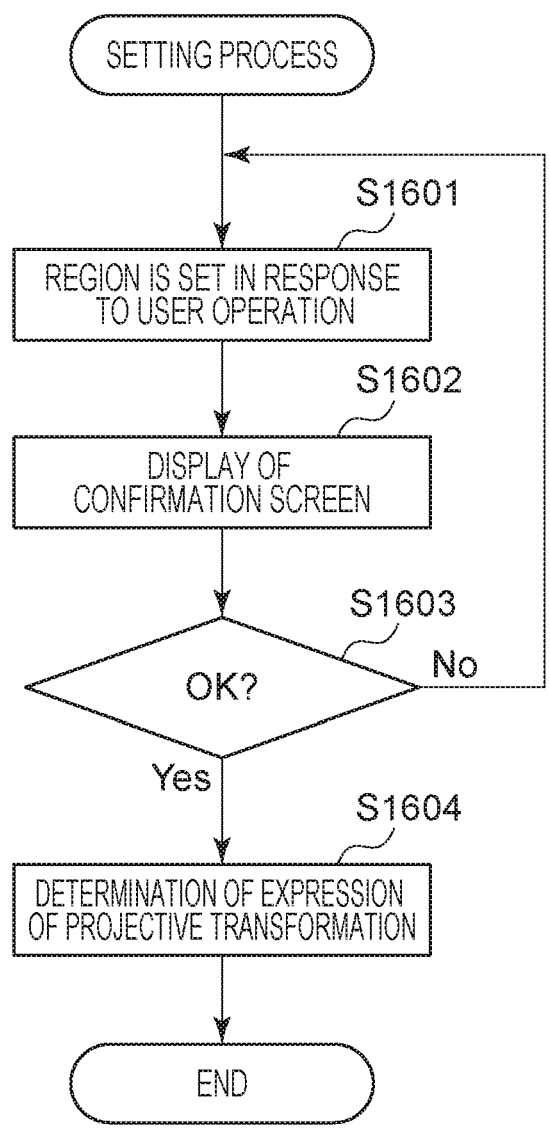
FIG. 16 illustrates a flowchart of a setting process that is performed by an image-displaying apparatus 500.

A setting process that is performed by the setting unit 503 of the image-displaying apparatus 500 will now be described with reference to FIG. 16. The setting unit 503 sets a method of converting the coordinates of the position of the human body that is detected in the imaged image into coordinates of the detection position of the human body in the map that is obtained in advance.

Figure 4:
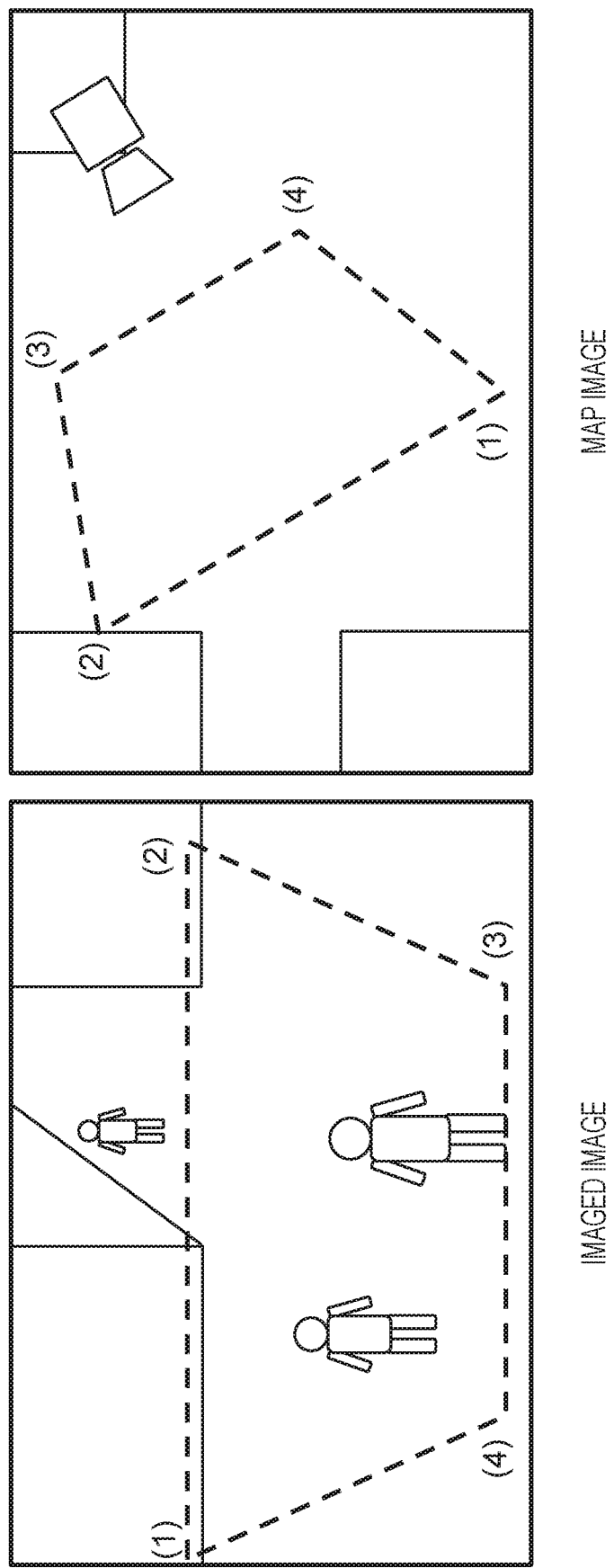
FIG. 4 illustrates association between an imaged image and a map.

A method of using associated points in the image and the map will be described. As illustrated in FIG. 4, a screen is displayed for a user to specify freely selected four points in the imaged image that is displayed on the display unit 502 and freely selected four points in the map, which are to be vertexes of polygons (S1601). When specification of the four points in the image and the map is detected, the setting unit 503 derives an expression (homography matrix H) of projective transformation for converting a freely selected point in the imaged image into an associated position in the map on the basis of a relationship between the positions of these points. When the associated points are specified by the user, a restriction on the order in which the points are specified is preferably predetermined to prevent mistaken association. For example, the order is determined to be "clockwise starting from the upper left". As illustrated in FIG. 4, it is effective that the order in which the points are specified is represented by numerals. When the specified coordinates and the order thereof are known, whether the input complies with the predetermined restriction can also be determined. Accordingly, in the case of violation of the restriction, a setting failure may be reported, and an input may be prompted again. In the case where plural cameras are installed, the setting unit 503 establishes association with the map for all of the cameras. However, in the case where physical information about three-dimensional positions of the cameras can be obtained by the image-displaying apparatus 500, association with the map for one of the cameras enables association for the other cameras to be obtained. According to the present embodiment, setting of a region with the four points is described. However, the same process can be performed in the case of a polygon having three points, or five points or more. The imaged image and the map can be associated with each other regarding plural regions.

A process for making setting that is made by the projective transformation simple and intuitive from the following three perspectives will now be described.

1. A user interface that can be set for a short time is achieved.
2. The relationship between the detection coordinates of the imaged image and the position of the region that is superposed on the imaged image is grasped.
3. Whether a desired conversion result is obtained is checked.

Figure 5:
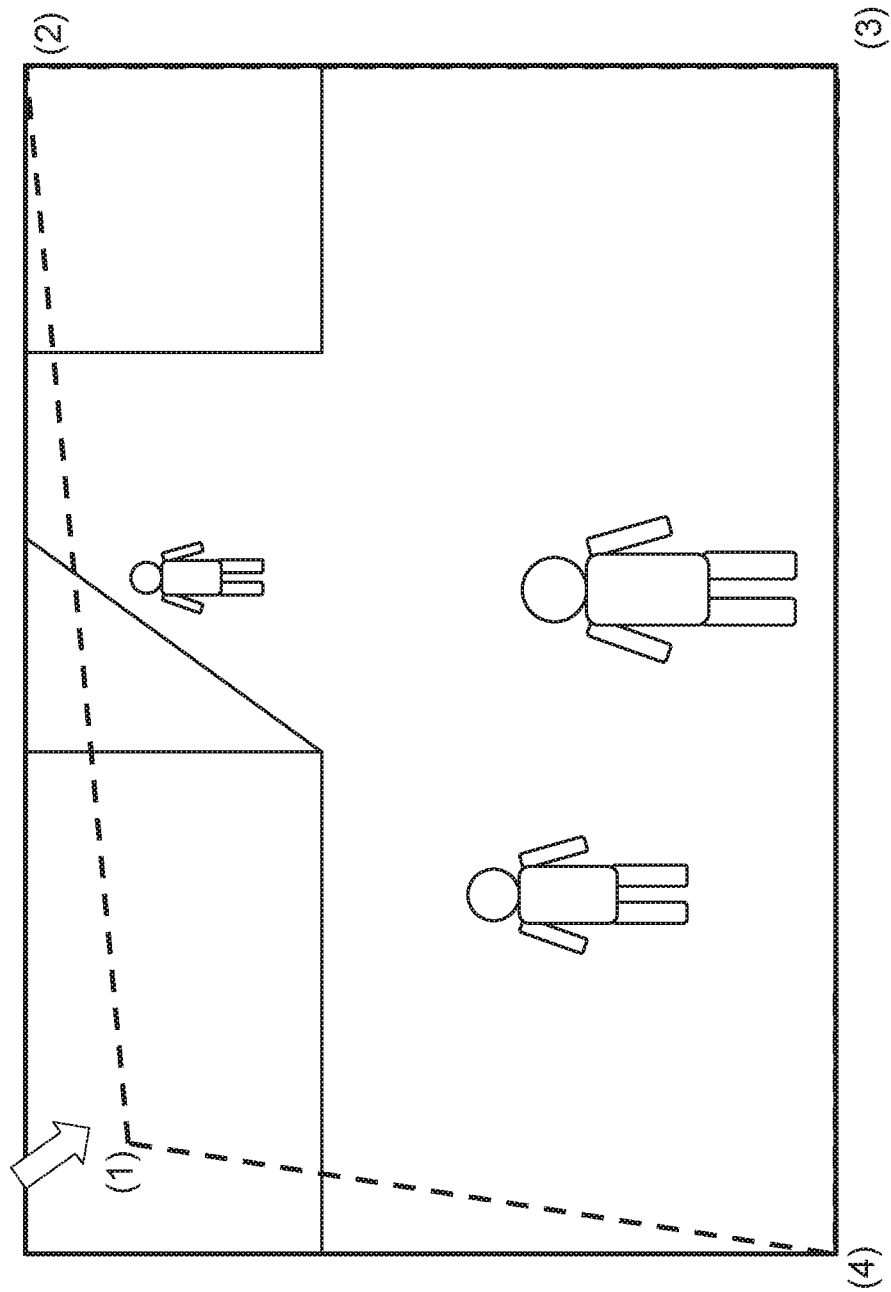
FIG. 5 illustrates a method of inputting associated points in the imaged image and the map.

Achievement of the user interface that can be set for a short time will be first described. Conversion of the detection coordinates by using the projective transformation is likely to make an error, and obtaining a desired totalization result and a visualization result often needs fine adjustment. Accordingly, it is preferable that the four associated points be able to be set and changed separately instead of being inputted in order every time. FIG. 5 illustrates an example of the user interface for specifying the region by moving the four points that are always displayed in the imaged image in order to achieve fine positional adjustment. It is possible that, in an initial state, freely selected four points or four corners of the imaged image and the map are automatically selected as the associated points to decrease time for input, and that a setter merely moves the points. In order to reduce movement of the points, the ground is presumed from the imaged image, and appropriate four corners on the ground can be set to be the initial points.

Figure 9A:
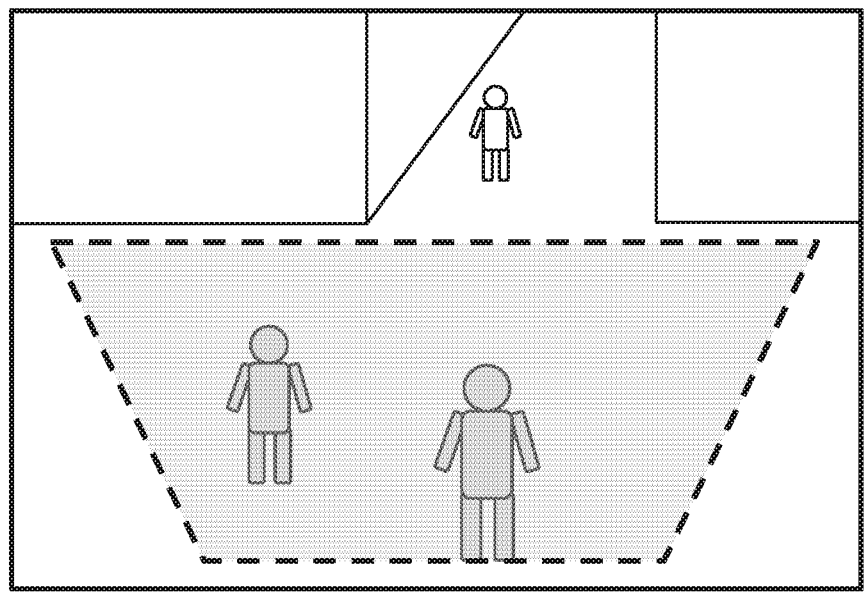
FIG. 9A illustrates an example of a UI for recalling that the associated points are inputted into the ground.
Figure 9B:
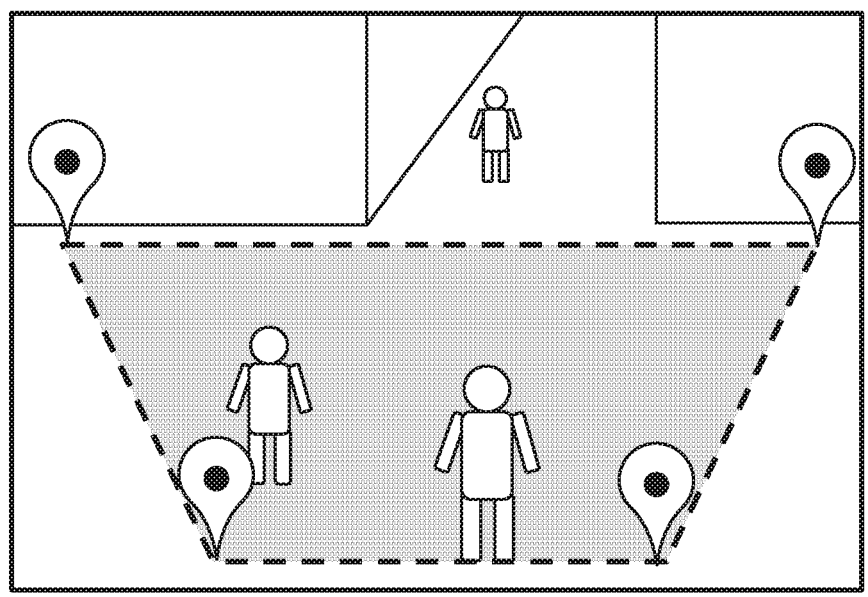
FIG. 9B illustrates an example of a UI for recalling that the associated points are inputted into the ground.

The grasp of the relationship between the detection coordinates of the imaged image and the position of the region that is superposed on the imaged image will now be described. In the case where the coordinates at the feet of the human body are selected as the detection coordinates, it is necessary to set the associated points with respect to the ground. When the specified region is displayed merely so as to be translucent and superposed as illustrated in FIG. 9A, an object is displayed behind the region, and there is a risk that the region is mistakenly recognized that the region is not set with respect to the ground. In FIG. 9B, two ways are figured out so that it is recognized that the associated points are set with respect to the ground. In a first way, the four points in the imaged image are arranged such that not simple symbols such as "○" but pin-shaped figures are adjacent to positions above the vertexes of the specified polygon so that it is recalled that the pin-shaped figures are stuck into the ground. In a second way, the human body is drawn such that a frame line that represents the specified region and the color of the region are not superposed on the human body because, when the human body is displayed behind the specified region, an impression that the specified region is located above the human body is given. For example, this is achieved by drawing each moving-body region, or the detection result out of the figure that represents the specified region. In the two ways, the human body is seen so as to be located above the specified region, and it can be readily seen that the region is specified with respect to the height of the ground.

Figure 6:
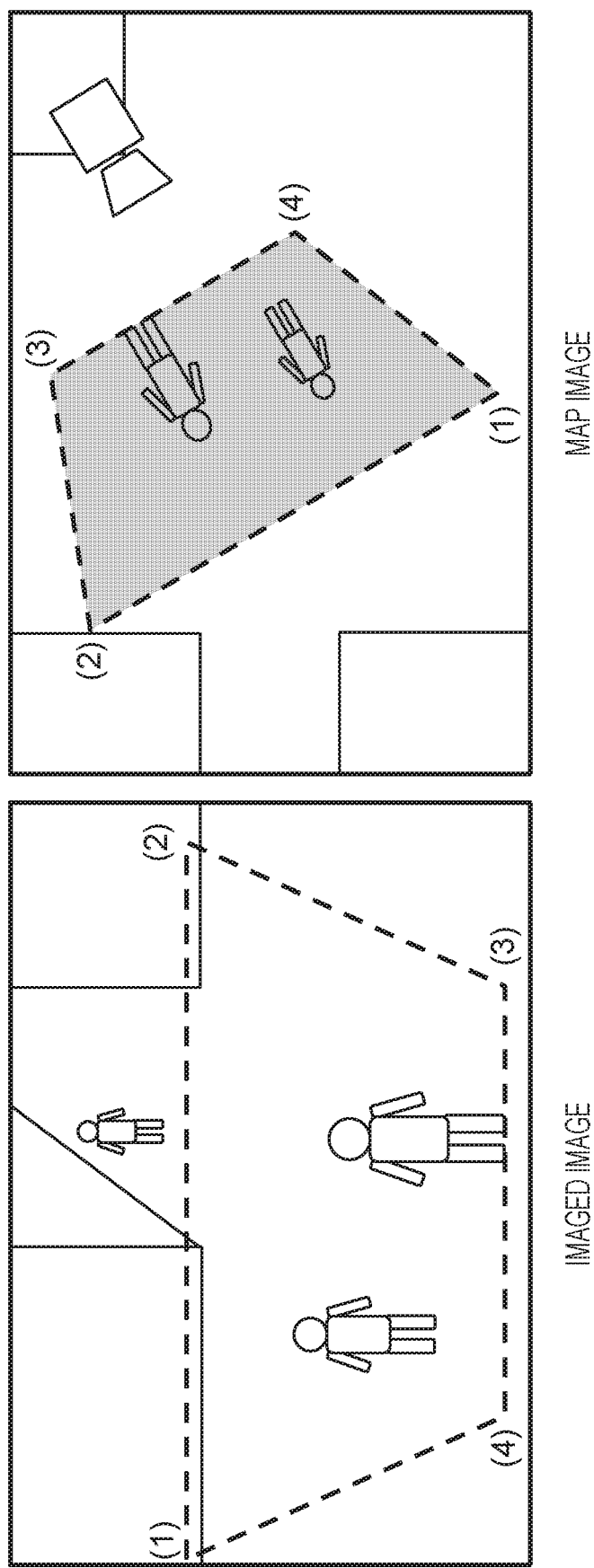
FIG. 6 illustrates an example in which the imaged image is deformed and superposed on the map to check the associated points.
Figure 7:
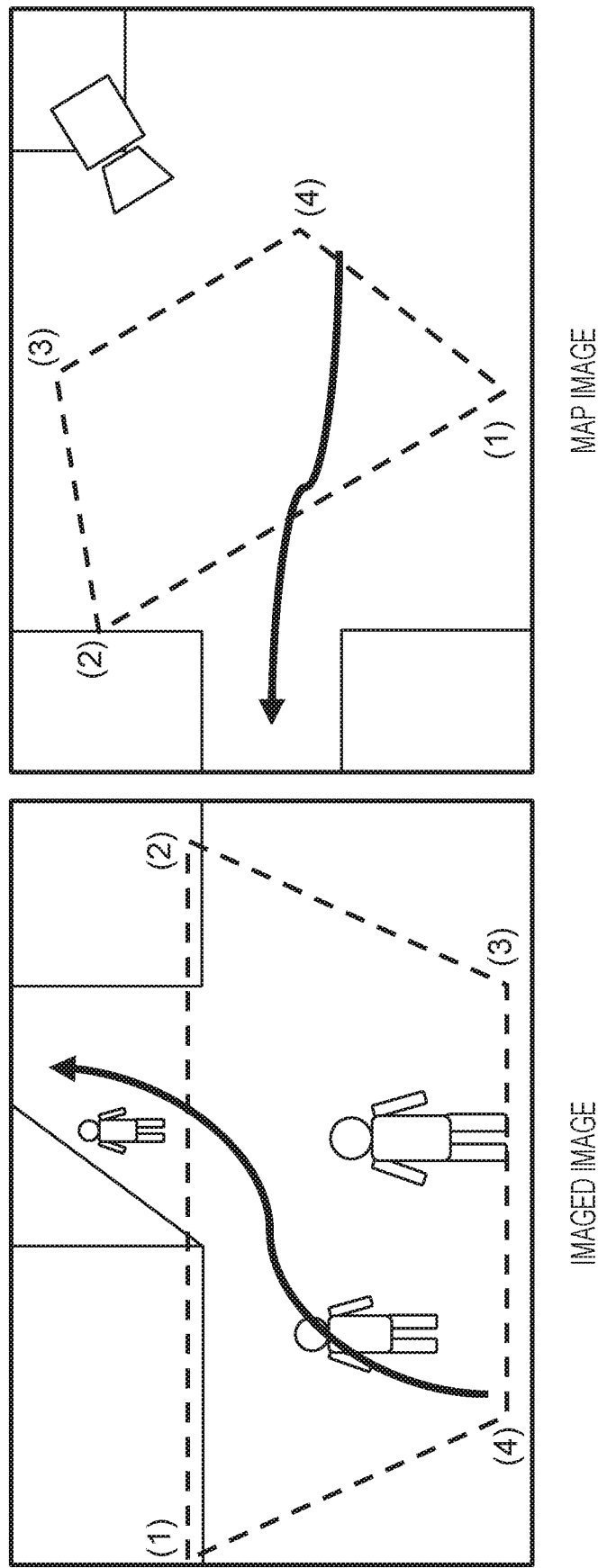
FIG. 7 illustrates an example in which movement trajectory is inputted into the imaged image and the associated points are drawn on the map to check the associated points.

The check whether desired conversion from the imaged image to the map is achieved will be described. When visual adjustment is needed, it can be considered that the totalization result is superposed on a setting screen for the associated points, and that the totalization result is obtained again in response to a setter operation and superposed again. However, this method is not suitable to closely investigate cause for the totalization result unintentionally displayed. In view of this, as illustrated in FIG. 6, a part of the imaged image is deformed on the basis of the expression of the projective transformation, superposed at the associated position in the map, pasted, and displayed (S1602). This allows a user to check the association from the overlook. As illustrated in FIG. 7, there is another method in which a freely selected line of flow is drawn in the imaged image after the associated points are set, and a corresponding line of flow (human trajectory) after the projective transformation is displayed on the map for fine checking. In the case where the user determines that the screen in FIG. 6 has no problem, the user select a "OK" button on a screen not illustrated. When it is detected that the "OK" button is selected (Yes at S1603), the expression of the projective transformation that is being calculated is determined (S1604), and the expression of the projective transformation is used for a freely selected position in the image. In the case of redoing, a "cancel" button is selected, the association of the region is set again (No at S1603).

The setting of the projective transformation is described above. However, the associated points can be inputted automatically not manually. For example, a method that can be considered is that markers having a certain size are physically provided at positions that can be the associated points in the imaged image, and that only the associated points in the map are inputted manually. The markers are detected instead of the associated points in the imaged image being inputted. It is only necessary for the setter to specify the positions of the markers that are provided by the setter as the positions in the map.

In the above description, the projective transformation is set for the single imaged image and the single map. This relationship may be developed into plural relationships. The single imaged image may be associated with plural images for different purposes and scales. There is a tendency that an image that is imaged at a position closer to the camera and an image that is imaged at a position farther from the camera have a larger association error. Accordingly, the projective transformation may be set multiple times for the single imaged image, and the expression of the projective transformation may be changed, for example, between a front image and a central image. In the case where plural expressions of the projective transformation are set, a location where an error of the projective transformation is likely to be made depends on the height, angle, and angle of view of the installed camera. Accordingly, candidates for settings may be automatically determined on the basis of such information.

Figure 17:
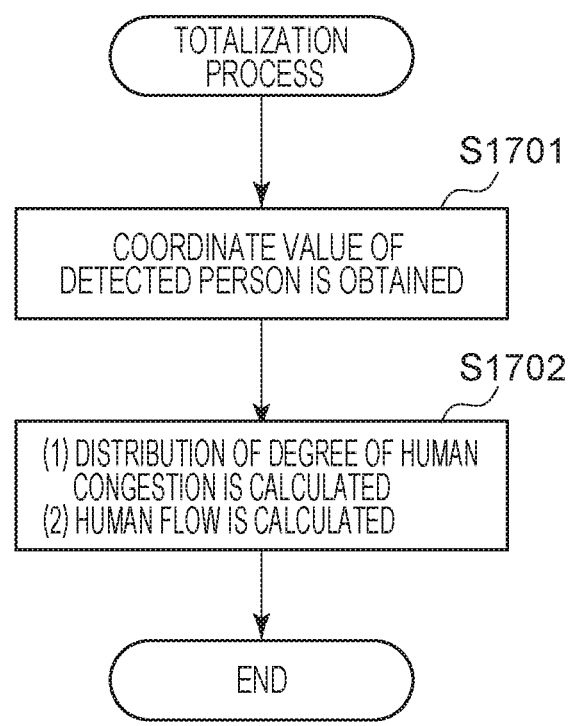
FIG. 17 illustrates a flowchart of a totalization process that is performed by a human-flow analyzing apparatus 400.

The process of the totalization unit 404 of the human-flow-analyzing sever apparatus 400 will be described with reference to FIG. 17. Information about the expression of the projective transformation that is derived by the image-displaying apparatus 500 is obtained, and the detection coordinates in the imaged image are converted into the coordinates in the map by using the obtained expression of the projective transformation (S1701). The human-flow-analyzing sever apparatus 400 performs the totalization process on the basis of the information about the converted coordinates (S1702). The totalization process includes a process for the human congestion state and a process for the human flow that represents the human movement flow.

Two examples of a method of obtaining distribution of the human congestion state will now be described with reference to FIG. 10 and FIG. 11.

FIG. 10 illustrate examples of the totalization process when the total number of people who are detected is used. As illustrated in FIG. 10A, a map region is divided into regions having a predetermined size to express distribution that represents the human congestion state. The coordinates that represent the position of the detected people are illustrated by black circles in the divided regions. FIG. 10B illustrates the number of the detected people in each region. As illustrated in FIG. 10C, a heat map in which the concentration of each region changes depending on the detection number is generated on the basis of the totalization result. In FIG. 10C, it is determined that the larger the number of the detected people, the higher the degree of the congestion, and the divided region is drawn with a dark color. The heat map may be drawn not only by merely coloring the region with a single color but also by somewhat coloring the vicinity of the particularly congested region. In the examples illustrated in FIG. 10, the region is divided by rectangles. However, the region may be divided by using a freely selected unit such as an area of the map or an indoor room.

Regarding the division size (division number) of each region, when the division size is too large (the division number is too small), the detection number in each region increases, and the different in congestion is unlikely to be grasped. When the division size is too small, (the division number is too large), not only the congestion from the overlook is unlikely to be grasped, but also there is a risk that the result differs from the fact due to an effect of a precision error of the detection position. In a method of dividing the region, for example, distance information about the map scale is determined in advance based on the precision error of detection. The size of an actual space that corresponds to the obtained region in the map can be obtained from the distance information about the scale. In consideration for the obtained size and the precision error of detection, the division size is determined. For example, when the precision of the position is ±1 m, the region is divided by a unit of 2 m to 3 m, which is 2 to 3 times the precision. This enables distribution of the congestion state to be obtained with higher precision.

In FIG. 11, the coordinates that represent the detection positions of people within a predetermined distance are grouped. It is determined that the degree of the congestion increases as the coordinates in each group are closer to each other. As in the above description, a heat map on the right-hand side can be obtained by drawing the congested region with a dark color. A grouping process may not be performed as the whole, but the distance between each detection result and the detection result nearest thereto may be obtained. Each region near the detection coordinates may be colored depending on the value thereof.

A method of determining the human flow will now be described with reference to FIG. 17. The totalization unit 404 obtains the latest (current) detection coordinates of a person in the current imaged image and the past (before a predetermined period after the latest detection result) detection coordinates of the person (S1701) and determines the human flow by using these. Specifically, a conversion formula that obtains the detection coordinates that represent the detection position of the person in the current image and the detection coordinates of the person detected in the past image is used for the projective transformation to obtain a position in the map. Map coordinates are calculated by calculating mp=Hfp (mp is the coordinates of the position at the feet in the map, fp is the coordinates of the position at the feet, and H is a homography conversion matrix). In the map, a movement direction of both points can be dealt with as a movement direction in the map, and the distance between the two points can be dealt with as the movement speed.

Figure 12:
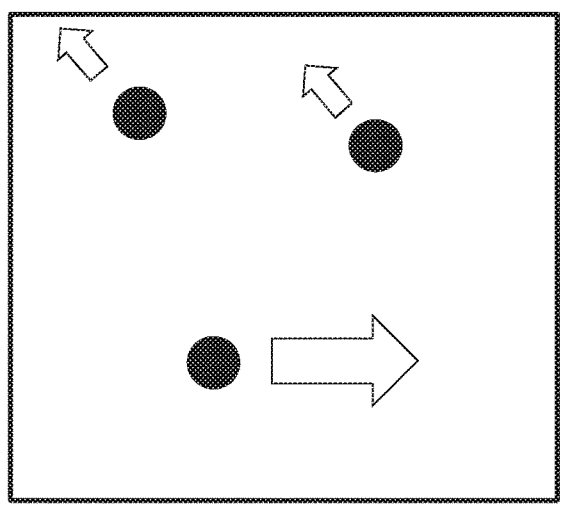
FIG. 12 illustrates a method of determining human flow.

In the case where the coordinates that represent the detection positions of people in the image are obtained, it is necessary to provide roughly entire human flow (movement direction of the people) to improve visibility. FIG. 12 illustrates an example of a method of obtaining the human flow. FIG. 12 illustrates a divided region in a single map. In a method of determining the human flow, a person is randomly selected from the detected people, and the human flow is determined to be the movement direction of the person. In the example illustrated in FIG. 12, a person on the uppermost left or on the right in the divided region is selected. The reason is that it can be considered that people are unlikely to move in plural directions in a narrow region, and it can be determined that any selection does not make much difference. It can be also considered that the average movement direction of the people is used or the direction is classified into four directions or eight directions for majority decision. This is an effective method to inhibit a mistake from being randomly selected due to mistaken detection when the human flow points the same direction to a certain extent. There is another thought that selects a person who moves a large distance or a person who move fast. There is no method of expressing accurate human flow in all cases, and these methods are preferably used appropriately.

The method of totalizing the congestion and the human flow is described above. Regarding the totalization period, when the totalization period is too short, the result approaches as close as the imaged image is actually seen, and an overview of the result that is obtained when the region is wide and plural cameras are used is unlikely to be grasped. In contrast, when the totalization period is too long, fine variations in the congestion and the human flow are unlikely to be followed. In view of this, the period is preferably increased on the basis of a setting of the map scale as the region to be totalized becomes wider.

Figure 8:
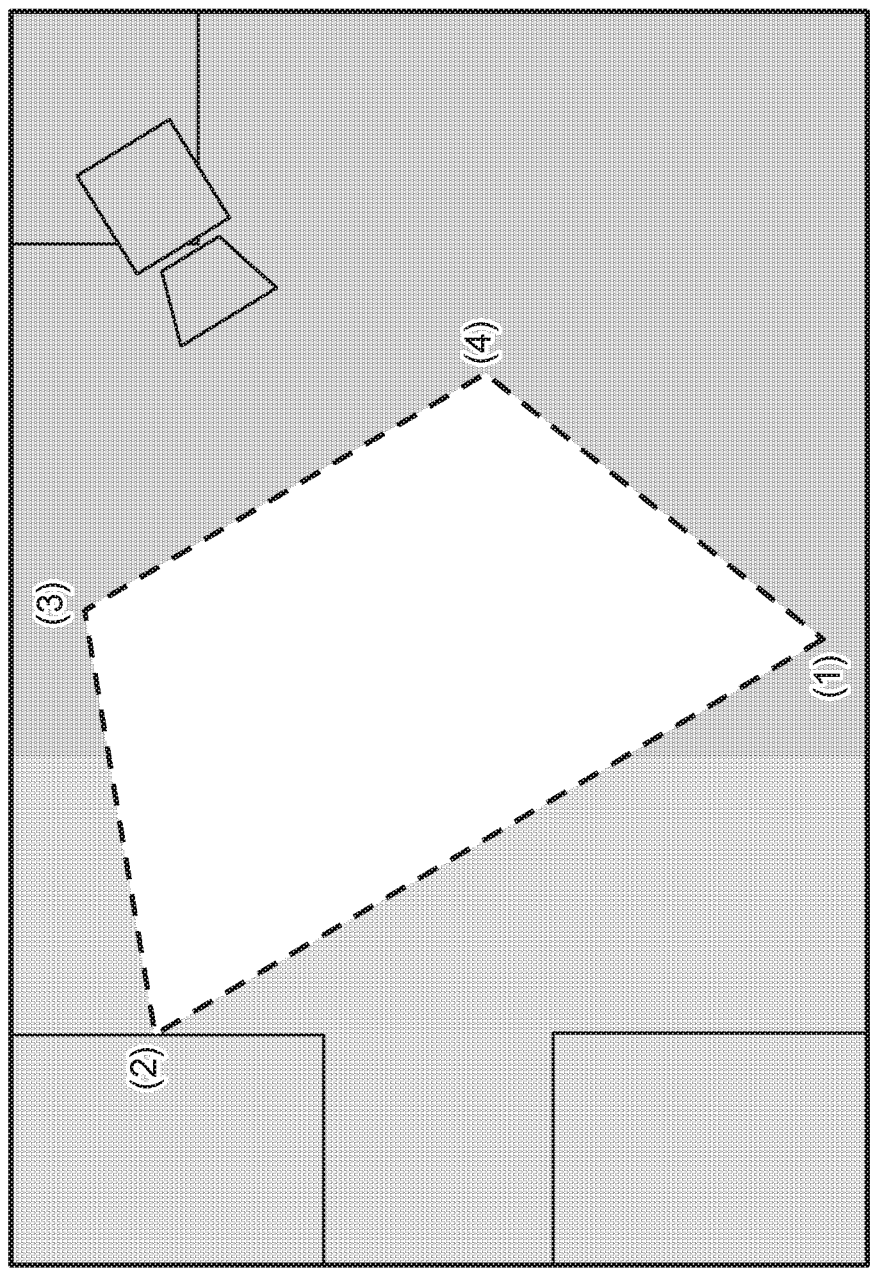
FIG. 8 illustrates an example of a blind spot in the imaged image that is expressed on the map.

In some cases where the coordinates of a position are converted by using the projective transformation, a large error is made depending on the position, and the converted coordinates are out of the map, or the converted coordinates are in a wall. Such a conversion result is a mistake, and a region in the map that is excepted during totalization may be set. When plural cameras are installed, associated regions overlap in some cases. In these cases, there is a risk of duplicate count when each result of detection is merely totalized. Overlapping regions can be determined from the setting of the projective transformation. Accordingly, when regions that can overlap are totalized, a set of the coordinates of the detection result that are transmitted from different cameras at the same time may be totalized. In many cases, it is impossible to install each camera such that all regions in the map are covered, and it is necessary to return the result to the display device to know the blind spot of the camera. The associated points in the map are known by the projective transformation of the four corners of the imaged image. The use of this information enables the inside of the angle of view and the blind spot of the camera to be determined in the map. Accordingly, the position of the blind spot is preferably transmitted to the display device, and the blind spot of the camera is preferably displayed by grayout as illustrated in FIG. 8.

The totalization may be calculated every time on the basis of a request from the display device. However, each detection result itself is redundant and restricts recording capacity of the device when being saved over a long period of time. When the totalization is calculated every time, a response to the display device takes time. In view of this, the totalization unit performs the totalization process at regular intervals regardless of the presence or absence of the request for the result from the display device, the totalization result is saved in the human-flow-analyzing sever, and target data that is used for the totalization process is deleted after a predetermined period.

Figure 13:
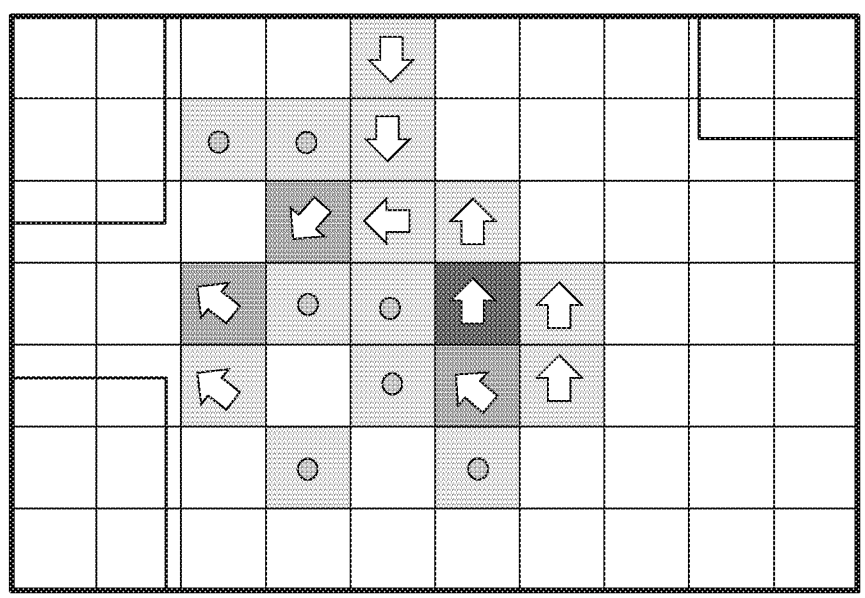
FIG. 13 illustrates an example of display of an analysis result of congestion and human flow.

The image-displaying apparatus 500 obtains information about the totalization result that is obtained by the totalization unit 404 of the human-flow-analyzing sever apparatus 400 and causes the display unit 502 to display the information on a screen. FIG. 13 illustrates an example of the totalization result of the congestion and the human flow. It is illustrated that as the color of each location becomes darker, the number of the detected people increases, which means the congestion occurs. Symbols that are drawn thereon represent the human flow. Points represent stagnation. Arrows represent the movement direction. A method of expressing the human flow is to be figured out. For example, it can be considered that the size, shape, length, and color of the arrows that are drawn are changed or the arrows are animated depending on the size of the human flow. The location of stagnation can be intentionally emphasized in a manner in which the location of stagnation is not illustrated by an arrow, or any symbol is superposed only on the position at which the congestion is detected. The drawing process may be performed by the image-displaying apparatus 500 or the human-flow-analyzing sever apparatus 400.

When the heat map is drawn, the color of the location of the congestion is changed from that of non-congestion. The determination may be made by an absolute value or a relative value. A threshold for determining the color may be set manually or may be selected manually by using the past detection result. The user may select an indicator, for example, how many people are present over one square meter, and the number of people in a block that is calculated by counting backward from the indicator may be used as the threshold. These values may be set separately depending on a time zone, the camera, and the map. The determination may not be made by the display unit 502 of the image-displaying apparatus 500 but can be made by the totalization unit 404 of the human-flow analyzing apparatus 400, and the display unit can comply with an instruction for drawing the congestion and the human flow.

The embodiment is described above in detail. The present invention can include an embodiment of, for example, a system, an apparatus, a method, a program, or a recording medium (storage medium). Specifically, the present invention may be applied to a system that includes plural devices (for example, a host computer, an interface device, an imaging device, and a web application) or an apparatus that includes a single device.

The object of the present invention is achieved also in the following manner. That is, the system or the apparatus is supplied with a recording medium (or a storage medium) that records a program code (computer program) of software for performing the functions according to the above embodiment. It goes without saying that the storage medium can be read by a computer. A computer (or a CPU or a MPU) of the system or the apparatus reads and executes the program code that is stored in the recording medium. In this case, the program code that is read from the recording medium performs the functions according to the above embodiment, and the recording medium that records the program code is included in the present invention.

The present invention relates to a human-flow-analyzing system that analyzes and visualizes the flow of human movement from an image that is photographed by a camera, a method of controlling the human-flow-analyzing system, and a program.

The present invention is not limited to the above embodiment. Various modifications and alterations can be made without departing from the spirit and scope of the present invention. Accordingly, the following claims are attached to make the scope of the present invention public.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A system for displaying a result of analysis of a human congestion state, or human flow that represents human movement, or both, the system comprising:
   a setting unit that associates a position in an image that is imaged by a camera with a position in a map that is obtained in advance;
   a detection unit that detects a person in the image that is imaged by the camera;
   a totalization unit that converts a position of the person detected by the detection unit into an associated position in the map on the basis of a setting made by the setting unit and that totalizes a result of the human congestion state and the human flow that represents the human movement on the basis of the converted position; and
   a display unit that displays, in a region into which the map is divided, a first image indicating the human congestion state and a second image indicating the human flow, based on a result that is obtained by the totalization unit, wherein the second image indicating the human flow is superimposed on the first image indicating the human congestion state,
   wherein the totalization unit sets a period of totalization to be longer in a wider region depending on a map scale.

2. The system according to claim 1, wherein the detection unit presumes a position at feet of a human body from a face or an upper body of the human body that is detected when the position at the feet of the human body cannot be detected.

3. The system according to claim 2, wherein the totalization unit converts coordinates of the position at the human feet into a position in the map by using projective transformation that is determined and totalizes a number of the person who is detected for every divided region into which the map is divided.

4. The system according to claim 3, wherein the display unit displays a screen that represents the human congestion state and the human flow for every divided region on the basis of the number of the person who moves, or a movement speed thereof, or both.

5. The system according to claim 4, wherein the totalization unit selects a person for detecting the human flow and obtains a direction and a speed of movement of the person when there are people in the divided region into which the map is divided.

6. The system according to claim 1, further comprising: a drawing unit that draws polygons having the same number of vertexes on the map and the imaged image displayed by the display unit in response to a user input, and
   wherein the setting unit determines projective transformation for associating the position in the imaged image with the position in the map on the basis of a region of each polygon.

7. The system according to claim 6, wherein the setting unit draws, in the region of the polygon that is drawn on the map, an image in the region of the drawn polygon by the projective transformation.

8. The system according to claim 6, wherein the drawing unit draws a pin-shaped figure at a position related to each vertex of each polygon.

9. The system according to claim 6, wherein the drawing unit does not draw the polygons in a region of the detected person.

10. The system according to claim 1, wherein the setting unit determines a size of the divided region depending on a map scale.

11. The system according to claim 1, wherein the totalization unit determines a period of totalization depending on a map scale.

12. The system according to claim 1, wherein the totalization unit totalizes most results of human detection results of the image during a predetermined period.

13. The system according to claim 1, wherein the display unit displays a blind spot region of the camera on the map on the basis of association between the imaged image and the map.

14. The system according to claim 1, wherein the totalization unit determines a threshold that represents the congestion state on the basis of a map scale.

15. A display apparatus for displaying a result of analysis of a human congestion state, or human flow that represents human movement, or both, the display apparatus comprising:
 a totalization unit that converts a position of a person detected in an image imaged by a camera into an associated position in a map on the basis of a setting made by a setting unit and that totalizes a result of the human congestion state and the human flow that represents the human movement on the basis of the converted position; and
 a display unit that displays, in a region into which the map is divided, a first image indicating the human congestion state and a second image indicating the human flow, based on a result that is obtained by the totalization unit, wherein the second image indicating the human flow is superimposed on the first image indicating the human congestion state,
 wherein the totalization unit sets a period of totalization to be longer in a wider region depending on a map scale.

16. The display apparatus according to claim 15, further comprising: a setting unit that associates a position in the image imaged by the camera with a position in the map that is obtained in advance.

17. The display apparatus according to claim 16, wherein the display unit displays a blind spot region of the camera on the map on the basis of association between the imaged image and the map.

18. The display apparatus according to claim 15, further comprising: a drawing unit that draws polygons having the same number of vertexes on the map and the imaged image displayed by the display unit in response to a user input, and
 wherein the setting unit determines projective transformation for associating a position in the imaged image with a position in the map on the basis of a region of each polygon.

19. The display apparatus according to claim 18, wherein the setting unit draws, in the region of the polygon that is drawn on the map, an image in the region of the drawn polygon by the projective transformation.

20. The display apparatus according to claim 18, wherein the totalization unit converts coordinates of a position of a person into a position in the map by using the projective transformation that is determined and totalizes a number of the person who is detected for every divided region into which the map is divided.

21. The display apparatus according to claim 20, wherein the display unit displays a screen that represents the number of the person and the human flow for every divided region on the basis of the number of the person who moves, or a movement speed thereof, or both.

22. The display apparatus according to claim 21, wherein the totalization unit selects a person for detecting the human flow and obtains a direction and a speed of movement of the person when there are people in the divided region into which the map is divided.

23. The display apparatus according to claim 15, wherein the setting unit determines a size of the divided region depending on a map scale.

24. The display apparatus according to claim 15, wherein the totalization unit determines a period of totalization depending on a map scale.

25. The display apparatus according to claim 15, wherein the totalization unit totalizes most results of human detection results of the image during a predetermined period.

26. The display apparatus according to claim 15, wherein the totalization unit determines a threshold that represents the congestion state on the basis of a map scale.

27. A non-transitory computer-readable storage medium which stores a computer program for displaying a result of analysis of a human congestion state, or human flow that represents human movement, or both, the computer program causing a computer to:
 convert a position of a person detected in an image imaged by a camera into an associated position in a map on the basis of a setting made by setting and that totalizes a result of the human congestion state and the human flow that represents the human movement on the basis of the converted position;
 display, in a region into which the map is divided, a first image indicating the human congestion state and a second image indicating the human flow, based on a result that is obtained by the totalizing, wherein the second image indicating the human flow is superimposed on the first image indicating the human congestion state; and
 setting a period of totalization to be longer in a wider region depending on a map scale.

* * * * *